United States Patent [19]
Wolfer et al.
[11] 3,729,708
[45] Apr. 24, 1973

[54] ERROR DETECTING AND CORRECTING APPARATUS FOR USE IN A SYSTEM WHEREIN PHASE ENCODED BINARY INFORMATION IS RECORDED ON A PLURAL TRACK

[75] Inventors: Allan J. Wolfer, La Jolla; Edward Cooper, San Diego, both of Calif.

[73] Assignee: Eastman Kodak Company, Rochester, N.Y.

[22] Filed: Oct. 27, 1971

[21] Appl. No.: 192,865

[52] U.S. Cl. ....................... 340/146.1 F, 340/174.1 B
[51] Int. Cl. ............................ G06f 11/10, G06k 5/04
[58] Field of Search ................. 340/146.1, 146.1 AG, 340/146.1 F, 174.1 B

[56] References Cited

UNITED STATES PATENTS

| | | | |
|---|---|---|---|
| 2,977,047 | 3/1961 | Bloch | 340/146.1 AG |
| 3,142,829 | 7/1964 | Comstock | 340/146.1 F |
| 3,183,483 | 5/1965 | Lisowski | 340/146.1 AG |
| 3,193,812 | 7/1965 | Friend | 340/174.1 B |
| 3,273,120 | 9/1966 | Dustin et al. | 340/146.1 AG |
| 3,439,331 | 4/1969 | Brown et al. | 340/174.1 B |

*Primary Examiner*—Charles E. Atkinson
*Attorney*—W. H. J. Kline et al.

[57] ABSTRACT

In apparatus for decoding a byte of phase encoded binary information having a plurality of information bits and one parity check bit for the information bits and wherein each such bit is recorded in a selected one of a plurality of tracks on a suitable information storage medium such as a magnetic tape, circuit means is provided for detecting parity errors in the information bits of each byte and for correcting a single missing information bit. Further, if more than one bit within a single byte of information is missing, the circuit means provide at the output a signal or manifestation indicative of such multiple error.

2 Claims, 13 Drawing Figures

EDWARD COOPER
ALLAN J. WOLFER
INVENTORS
BY Raymond S. Owen
W. W. J. Kline
ATTORNEYS

EDWARD COOPER
ALLAN J. WOLFER
INVENTORS

BY Raymond L. Owens

W. H. J. Kline

ATTORNEYS

EDWARD COOPER
ALLAN J. WOLFER
INVENTORS
BY Raymond L. Owens
W. H. J. Kline
ATTORNEYS

EDWARD COOPER
ALLAN J. WOLFER
INVENTORS

BY Raymond L. Owens
W. H. J. Kline
ATTORNEYS

EDWARD COOPER
ALLAN J. WOLFER
INVENTORS

BY Raymond J. Owens
W. H. J. Kline
ATTORNEYS

EDWARD COOPER
ALLAN J. WOLFER
INVENTORS

BY Raymond S. Owens
W. H. J. Kline
ATTORNEYS

EDWARD COOPER
ALLAN J. WOLFER
INVENTORS

BY Raymond S. Owen
W. H. J. Kline
ATTORNEYS

ERROR DETECTING AND CORRECTING APPARATUS FOR USE IN A SYSTEM WHEREIN PHASE ENCODED BINARY INFORMATION IS RECORDED ON A PLURAL TRACK

CROSS REFERENCE TO RELATED APPLICATIONS

Reference is made to commonly assigned copending U.S. patent application Ser. No. 192,836, entitled, "APPARATUS FOR SELECTING A MASTER CLOCK SIGNAL FROM A PLURALITY OF CLOCK SIGNALS," filed in the names of Wolfer and Cooper; to commonly assigned copending U.S. patent application Ser. No. 192,861, entitled, "ADAPTIVE SYNCHRONIZING APPARATUS FOR HANDLING PHASE ENCODED BINARY INFORMATION," filed in the names of Wolfer and Cooper; and to commonly assigned copending U.S. patent application Ser. No. 192,837, entitled, "APPARATUS FOR SENSING AND PROCESSING MISSING OR ERRONEOUSLY RECORDED INFORMATION," filed in the names of Wolfer and Cooper.

BACKGROUND OF THE INVENTION

This invention relates to apparatus for decoding phase encoded binary information from a plurality of tracks recorded upon an information storage medium such as a magnetic tape.

DESCRIPTION OF THE PRIOR ART

It is well known in the art to record information in a binary system in which characters or other information may be recorded in terms of "1's" and "0's." More specifically, a character may be recorded upon a suitable storage medium such as magnetic tape in terms of a group (hereinafter referred to as a "byte" but which is often described as a "character" in the art) of bits, which bits take the form of "1's" or "0's." Phase encoded binary information is often used and may take various forms known in the art. In one such form which is used commercially, a series of binary bits, i.e., "1's" and "0's" are recorded in a train of signal transitions (or reversals) from a first or low level to a second or high level. Each such transition is recorded or disposed within a predetermined period, which will be referred to herein as a digit period, although it is sometimes referred to in the art as a bit cell. In particular, binary signals indicative of "1's" may be considered to comprise reversals going in a first direction from a first level to a second level, while binary signals indicative of "0' s" may be considered to comprise reversals in the opposite direction from the second level to the first level. With reference to FIG. 3 of the drawings, there is shown a phase encoded signal in which binary "1" signals are indicated by a positive going reversal and binary "0" signals indicative by a negative going signal.

As shown in FIG. 3A, the significant or information bearing transitions, i.e., the positive and negative going reversals are indicative respectively of "1" and "0" binary signals, are disposed substantially midway within a digit period. Further, it is noted that the signal has other reversals at the boundary between certain digit periods which are not information bearing signals. For example, between the positive going reversals occuring at the times $t_1$ and $t_2$, there is a negative going reversal in order that a positive going reversal may occur at time $t_2$. Thus, where two consecutive signals are of the same type, there must be a reversal at the boundary between digit periods. Although such reversals are important, since they are not indicative of binary information they will be termed herein a nonsignificant reversal which terminology is with reference to this lack of binary information content.

In order to distinguish the significant from the nonsignificant reversals, it is necessary to sample or to gate the phase encoded signal so as to only detect the significant reversal indicative of the recorded information. For example, the phase encoded signal shown in FIG. 3 could be applied to an AND gate which would be periodically enabled for a predetermined time within each digit period so that only the significant reversals at times $t_1$, $t_2$, $t_3$ . . . would be processed thereby preventing sampling of the nonsignificant reversals. Such a predetermined time interval is sometimes referred to as a sample window or aperture. One characteristic of the phase encoded signal is that it may be considered to be "self-clocking." By "self-clocking" it is meant that the information bearing signal may be used to generate a regular, periodic clock signal without recording a separate clock signal upon an additional track of the information storage medium. Further, the self clocking signal may be used for generating enabling or aperture signal to be applied to the AND gate to examine (or sample) the phase encoded signal at times $t_1$, $t_2$, $t_3$ . . . as just explained. With regard to FIG. 3, the phase encoded signal provides either positive or negative going transitions at regular periodic intervals disposed halfway between the digit periods. The significant reversals are intended to be regularly spaced and may be used as a clock signal to time the various operations of the information handling apparatus including the sampling of the phase encoded signal. U.S. Pat. No. 2,700,155 shows the detection of the regular periodic reversals of a phase encoded signal for the purpose of sampling the signal.

Illustratively, a phase encoded signal on each track of a medium may be recorded in defined blocks of information including a preamble and a postamble to indicate the passing of the block of information. In order to synchronize time and phase of the gating of the phase encoded signal to sense the significant reversals, the preamble may be used to set the clock and gating circuits to open the sample window gate at times $t_1$, $t_2$, $t_3$ etc. For example, the preamble comprises a predetermined format and in one illustrative embodiment, may be composed of all "1" or all "0" signals followed by a single signal of the opposite going polarity. In addition, the preamble may function to synchronize a clock circuit or oscillator so that as the information block passes the read out mechanism, the AND or other gating circuit will be enabled to read out the significant reversals of the phase encoded signal. After reading out the phase encoded signals from the information block, a postamble signal may be provided to notify the information handling apparatus that an information block has passed.

Phase encoded signals may be recorded on a plurality of tracks upon a suitable information storage medium such as magnetic tape. As indicated above, binary information may be indicated as either a "1" or a "0"

bit. The use of a plurality of tracks enables the user to record a group or byte of bits in each of the plurality of tracks. The information bits of a byte may be read out simultaneously and sensed to indicate a particular alpha-numeric character or other quantum of information. One advantage of a phase encoded signal, is that a high density of information may be recorded on the information storage medium. In any data handling system, error avoidance is of importance. Errors are often caused by component failure and intermittent signal deviation resulting from additive noise. The chance of error typically increases where information is transferred from one system or subsystem to another. One of the simplest approaches which has found wide acceptance to detect errors in binary information is called a parity check. Suppose, for example, that bytes of information of eight bits each are stored on a magnetic tape. If a parity check bit (viz. a nineth bit) is added to each byte in such a way that the number of 1-bits in each byte is always even, then the byte is coded with an even parity. In decoding such a byte, the number of 1-bits is odd, then there is at least one error in that decoded byte. While parity checking is effective, it only facilitates error detector but does not permit error corrections without retransmission, since it indicates that there is an error in one of the information bit positions but does not indicate which position is in error.

In order to provide for error correction, codes have been devised which add another redundant bit to permit both error detection and correction. One of the most commonly used of such codes is the minimum-distance 3 Hamming Code. Of course, by adding another bit position, the complexity of the decoding apparatus further increases. In another approach disclosed in U.S. Pat. No. 3,142,829 to Comstock, means are provided to determine if each information bit of a byte is present. If a bit is missing, a replacement bit (either a "1" or "0") is inserted, which is selected to cause a parity check satisfaction.

SUMMARY OF THE INVENTION

It is therefore an object of this invention to provide improved apparatus for detecting whether a byte of phase encoded bits recorded on a plurality of tracks satisfy parity condition and to insert a bit in the track wherein a missing bit occurs so that a correct signal may be supplied.

It is a more specific object of this invention to detect when more than one bit of a byte of information is missing and for preventing the transmission of the information.

In accordance with these and other objects of this invention, the teachings of this invention are accomplished by providing apparatus for decoding and processing information from a plurality of information tracks recorded upon a storage medium, including circuit means for detecting and correcting a single missing or erroneously recorded bit of a byte of information, and circuit means responsive to more than one missing bit of a byte of information, for preventing the transmission of information to an output. Further, when more than one bit of a byte of information is detected to be erroneously recorded or missing, a suitable signal or manifestation may be placed upon the output to indicate that a plural error condition has occurred and that the information is not suited for further processing.

Further, a suitable signal may be recorded in each track of the medium indicating the start of data (or information) in that track. Circuit means may be provided for indicating a missing or erroneously recorded start of data signal in a particular track and for correctly providing information recorded in that track. When more than one erroneously recorded or missing start of data signal is detected, the information recorded on the plurality of track is no longer transmitted to the output.

BRIEF DESCRIPTION OF THE DRAWINGS

In the detailed description of the preferred embodiment of the invention presented below, reference is made to the accompanying drawings in which.

DESCRIPTION OF THE PREFERRED EMBODIMENTS

Figure 1:
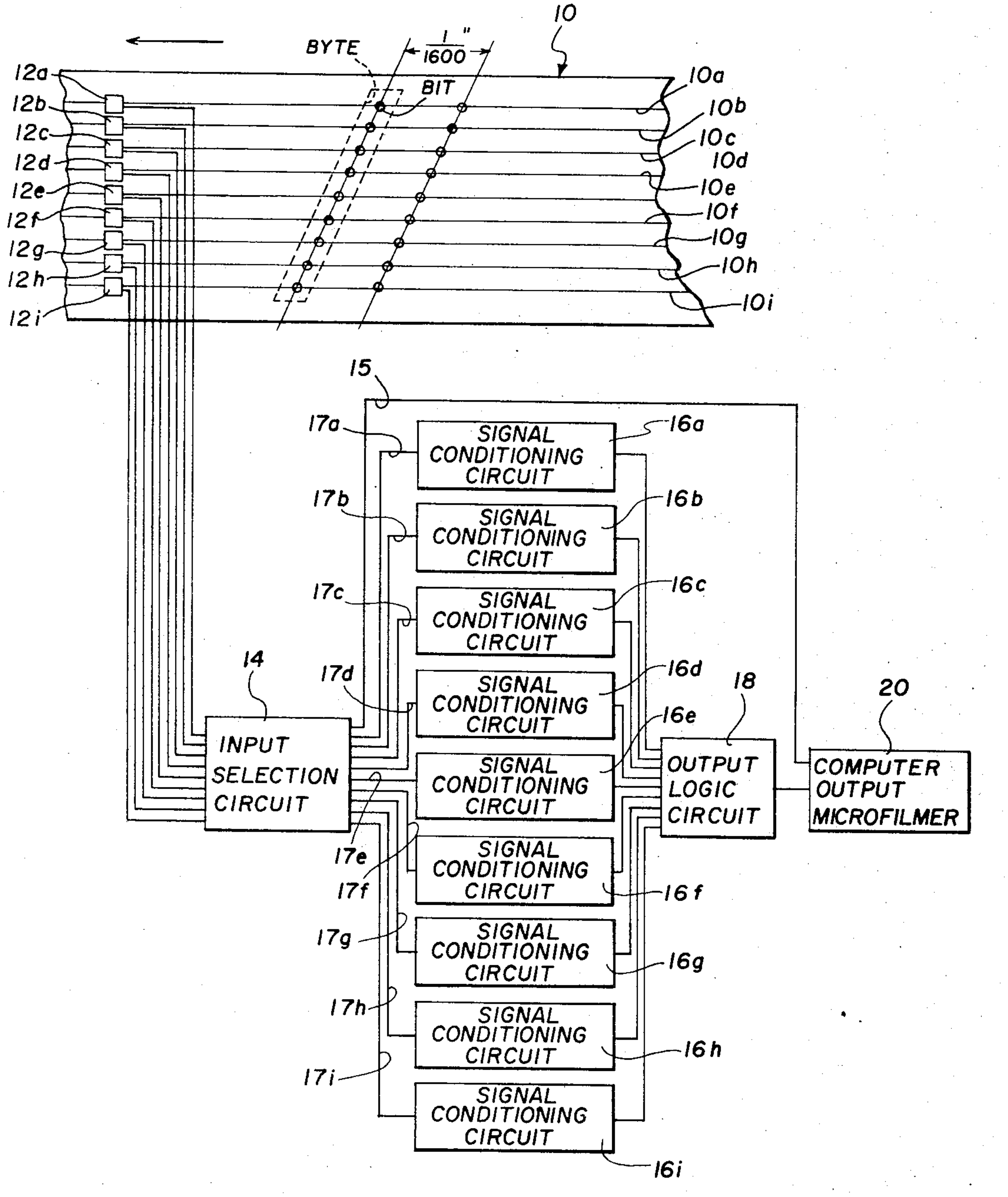
FIG. 1 is a schematic representation of an information handling apparatus in accordance with the teachings of this invention for deriving phase encoded signals from a plurality of tracks of a suitable storage medium and for applying processed signals to a computer output microfilmer.

With regard to the drawing and in particular to FIG. 1, there is shown an information storage medium such as a magnetic tape 10 having a plurality of tracks 10*a* to 10*i* upon which are recorded phase encoded binary signals in the form shown in FIG. 3. A like number of transducers 12*a* to 12*i* are respectively associated with the tracks 10*a* to 10*i* to sense and to generate electrical signals corresponding to the phase encoded signals recorded upon the medium 10. As indicated in FIG. 1, the medium 10 is moved in the direction of the arrow by a suitable mechanism (not shown) so that the successive sets of bytes of information bits are moved past the transducers 12. The sets or bytes of bits are spaced a digit period apart and as illustratively shown in FIG. 1, are spaced one sixteen-hundredth inch apart. As shown in FIG. 1, the bits of a single byte may be skewed with respect to the medium 10 and to the direction in which the medium 10 is moved. As discussed above, this relative skewing with respect to the transducers 12*a* to 12*i* presents a problem with regard to the reading out and to the processing of the information recorded upon the medium 10.

As shown in FIG. 1, the transducers 12*a* to 12*i* are connected to an input selection circuit 14. Though not a part of this invention, the input selection circuit 14 operates to direct the various types of signals to their particular interface apparatus. For example, if the input selection circuit 14 is instructed that the medium 10 is encoded with level mode binary non-returned to zero signals (NRZI), these signals may be directly applied over conduit 15 to a utilization station such as a computer output microfilmer 20. Illustratively, the computer output microfilmer 20 may take the form of the KOM–90 computer output microfilmer as manufactured by the assignee of this invention. Such a computer output microfilmer is capable of generating a series of characters upon a cathode ray tube whose image is directed up onto a strip of radiation sensitive medium such as photographic film. If on the other hand, the signals recorded upon the medium 10 are phase encoded signals, the input selection circuit 14 will apply the phase encoded signals along the conduits 17*a* to 17*i* to a plurality of signal conditioning circuits 16*a* to 16*i* respectively. In accordance with the teachings of this invention, the signal conditioning circuit 16*a* to 16*i* operates to sample the significant reversal of the phase encoded signals derived from the medium 10 and to sense the preambles disposed on each of the tracks 10*a* to 10*i*. The phase encoded signals are simultaneously applied from the signal conditioning circuits 16*a* to 16*i* to an output logic circuit 18 which operates in accordance with the teachings of this invention to detect and to correct for error or missing signals in one of the tracks and also to synchronize the simultaneous reading out of the bits of a single byte as stored on the signal conditioning circuits 16*a* to 16*i*. In turn, the corrected, decoded signals are applied from the output logic circuit 18 to the computer output microfilmer 20 where they may be displayed upon a cathode ray tube and recorded upon the strip of microfilm.

In FIG. 2, there is shown one of the nine signal conditioning circuits 16*a* to 16*i*; it may be understood that the other circuits are substantially as that shown in FIG. 2. The phase encoded signals derived from one of the transducers 12 are applied to a pair of threshold detecting circuits 22 and 24. The threshold detecting circuits 22 and 24 serve to detect respectively positive and negative going pulses and to each provide a signal indicative of that type of transition. Although such circuits may take various forms known in the art, they may include a "zero" level detecting circuit which is coupled to a polarity indicating circuit to provide the requisite output. The output signals derived from the threshold detecting circuits 22 and 24 are respectively applied to the "*a*" input terminals of AND gates 26 and 28 which respectively serve as gates or sampling circuits for the positive and negative reversals of the phase encoded signal. An enabling clock or window sampling signal is derived as will be explained from a sample window clock circuit 25 and is applied to the "*b*" input terminals of AND gates 26 and 28. Illustratively, the clock circuit 25 may have a duration of 3.0 microseconds at a repetition or cycle rate of 120 KH. With respect to FIG. 3, the clock pulses are periodically generated to include times $t_1$, $t_2$, $t_3$ etc. in order that only significant reversals are sensed and are processed by the signal conditioning circuits 16. The signals gated by the AND gates 26 and 28 are respectively applied to monostable multivibrator circuits 30 and 32, which in response to input signals provide output signals of a fixed pulse width. In turn, the output signals derived from the monostable multivibrator circuits 30 and 32 are applied respectively to the "*a*" and "*b*" inputs of OR gate 36 and also to the clear (CL) and preset (PR) input terminals of memory circuit 34.

As is well known in the art, the memory circuit 34, which may illustratively take the form of a latch-type flip-flop circuit, will respond to a "1" signal applied to the clear input terminal (CL) by providing a "1" signal on the Q output terminal and to a 0 signal applied to the preset input terminal (PR) by generating a "0" output signal at the Q output terminal. Thus, a "1" signal will be generated by the Q output terminal of the memory circuit 34 when a positive going pulse is sensed, and a "0" output signal will be provided when a negative going signal is sensed. The "1" and "0" signals derived from the memory circuit 34 are applied sequentially as will be explained to memory circuits 50 to 53 to store four bits of information derived sequentially from the associated track of the medium 10. As will be explained later in detail, the first bit of information will be stored upon the memory circuit 50 with the second, third and fourth bits stored sequentially upon the memory circuits 51, 52 and 53. As shown in FIG. 2, the output signal derived from the Q terminal of the memory circuit 34 is applied to the clear (CL) input terminal of the memory circuits 50 to 53. A counter circuit 46 is provided to apply timing or clock signals to the clock (C) input terminal of the memory circuits 50 to 53 in order to sequentially prepare the memory circuits 50 to 53 to receive and store the signals sequentially generated by the memory circuit 34.

In the course of deriving signals from one of the tracks of the medium 10, there may be instances when one of the flux reversals fails to appear or is missing. This may result from a failure to record the signal in the first instance or from some problem in the playback apparatus such as a speck of dirt interfering with one of the transducers 12. Such missing signals may be termed "weak" or spurious signals, and in accordance with the teachings of this invention, a warning or error signal will be generated by the corresponding signal conditioning circuit 16, which may be applied to initiate error correcting procedures. As explained in this copending application, binary information may be recorded on information tracks and an additional, parity track may be recorded to provide supplementary information by which weak bits or signals may be corrected. For example, the binary bit in the parity track may be a "1" or a "0" dependent upon whether the number of "1's" is even or odd in the other tracks. Thus, if one of the bits is missing, the parity bit may be used to indicate whether the missing bit is a "1" or a "0" signal. If it is known whether the missing signal is a "1" or a "0" and in addition, in which track the weak signal occured, it is possible to supply the correct missing bit of information.

The signal conditioning circuits 16 are sensitive to the absence of a signal reversal (i.e., a weak signal) to generate an error signal indicative of the presence of a weak signal. With reference to FIG. 2, signals indicative of a positive going transition are derived respectively from the monostable multivibrator circuits 30 and 32 and are applied to the "*a*" and "*b*" inputs of the OR gate 36. The OR gate 36 is responsive to the application of either signal, to generate an output signal which is applied to an AND gate 38. Thus, the output signal derived from the OR gate 36 is indicative of a reversal regardless of whether it is negative or positive going. An enabling signal is derived from the clock circuit 25 and applied to the "*b*" input of the AND gate 38 to provide an output signal which is applied to the clear input terminal (CL) of a "weak" signal memory circuit 40. In normal operation, a "true" signal will be generated by the AND gate 38 and will be applied to the clear input terminal (CL) of the weak signal memory circuit 40. In the absence of a true signal, the weak signal memory circuit 40 will generate a weak or error indicating signal (i.e., a "1" signal) which in turn is applied to the clear input terminals (CL) of a plurality of memory circuits 54 to 57. More specifically, a periodic preset signal is derived from the clock circuit 25 and is applied to the preset terminal (PR) of the weak signal memory circuit 40. In the absence of a true signal derived from the AND gate 38, the periodic preset signal will cause the weak signal memory circuit 40 to provide a "1" or high signal on its Q output terminal.

In a manner similar to that described above, the weak or error signal will be applied to the memory circuit 54 to 57 in synchronization with the application of the information signals to the memory circuits 50 to 53. More specifically, as explained above, the counter circuit 46 is coupled to the clock input terminals (C) of the memory circuits 54 to 57. As seen in FIG. 2, the counter circuit 46 applies a clock pulse simultaneously to memory circuits 50 and 54, 51 and 55, 52 and 56, and 53 and 57. Thus, if a series of four bits, the last of which is a missing or error bit, is applied to the signal conditioning circuit 16, the first three information bearing bits will be successively stored upon memory circuits 50, 51 and 52. When the error or missing bit is detected, the weak signal memory circuit 40 will generate at the Q output terminal a weak or error signal which will be applied to the memory circuit 57. The memory circuit 57 has received a timing or clock pulse, and upon receipt of the weak or error signal upon its clear input terminal (CL) will change its state to generate a "1" signal at its Q output terminal.

In order to overcome the problem of skewing, it is necessary to receive and store for a period corresponding to the maximum skew between the bits of information making up a single byte, upon each of the signal conditioning circuits 16*a* to 16*i*. As indicated in FIG. 2, each of the signal conditioning circuits 16*a* to 16*i* has a plurality of memory circuits 50 to 53 upon which binary bits from the same bit position from successive bytes are sequentially stored. After the delay period dependent upon maximum skew, the bits stored upon the corresponding set of memory circuits 50, 51, 52 or 53 (one memory circuit in each of the signal conditioning circuits 16*a* to 16*i*) are then simultaneously read out. As shown in FIG. 2, the Q output terminals of the memory circuits 50 to 57 are each connected to one of the inputs of AND gates 60 to 67 respectively. The other input signals for the AND gates 60 to 67 are derived from a counter 78 which serves to sequentially enable the AND gates 60 to 63 and 64 to 67. More specifically, terminals A, B, C and D of the counter 78 are connected respectively and to AND gates 60 and 64, 61 and 65, 62 and 66, and 63 and 67. Counter 78 operates to sequentially apply signals at periodic intervals to terminals A, B, C and D in order that AND gates 60, 61, 62 and 63 (and AND gates 64, 65, 66 and 67) are sequentially enabled to read out in that same order the signals stored upon the memory circuits 50, 51, 52, 53 (and the memory circuits 54, 55, 56 and 57). The output signals generated by the AND gate 60, 61, 62 and 63 are applied to the input terminals of an OR gate 70 so that when one of the AND gates 60 to 63 generates an output signal, an output signal will be provided by the OR gate 70. In a similar manner, the output terminals of the AND gates 64 to 67 are applied to the input terminals of an OR gate 72, which responds to one of the output signals derived therefrom to provide an output signal. It may be understood that the terminals A, B, C and D of the counter 78 are connected to the other AND gates corresponding to the AND gates 60 to 67 shown in FIG. 2 in each of the signal conditioning circuits 16*a* to 16*i* so that the bits of a single byte will be read or strobed out simultaneously from each of the signal conditioning circuits 16*a* to 16*i*. Further, if a weak signal appears in one of the bits of a byte, an error signal will be derived from the OR gate 72 in synchronism with the bits being derived from the data output terminals of the other signal conditioning circuits 16. Thus, the particular track upon which the weak signal appears may be identified by which signal conditioning circuit 16 generates the weak signal.

With reference to FIG. 1, there is shown in exaggerated form that the bits of a single byte may be skewed with respect to each other and to the direction in which the information storage medium 10 is being directed. Thus, it is necessary to store each bit upon a designated memory circuit in each of the signal conditioning circuits 16*a* to 16*i* a period of time dependent upon the period between the recording of the first bit and the last bit. As will be explained later and as shown in FIG. 2, a delay-master timing circuit 76 is provided to insure a delay between the storage of the signals upon the memory circuits 50 to 57 and the read-out of the signals through the OR gates 70 and 72, and thereby de-skew the information bits of a byte. The binary, phase encoded information is recorded upon the track of the information storage medium 10 in a series of spaced data blocks including a preamble, a data portion and a postamble. In one illustrative embodiment of this invention, the preamble may include 40 "0" signals followed by a " 1" signal and the postamble may include a "1" signal followed by 40 "0" signals. As mentioned above, the preamble is required so that the clock circuit 25 may be synchronized with the occurrence of the significant reversals and in particular to generate periodic clock signals to enable the AND gates 26 and 28 at times corresponding to the significant (as opposed to the non-significant) reversals.

With respect to FIG. 2, the output terminal of the threshold detection circuit 24 for negative going reversals, is connected to the sample window clock circuit 25 and in particular to a switch 80, which initially is disposed in its first position as shown in FIG. 2. Sample window clock circuits may take various forms known in the art. In accordance with this invention, during the sensing of the preamble, the output signal initially derived from the threshold detection circuit 24 is indicative of the negative going reversals or "0" signals of the preamble and is applied to a one-shot multi-vibrator circuit 82, which provides in response thereto pulses of a predetermined fixed length, for example 400 nanosec. The fixed length pulses are applied to reset a counter 84, to reset a variable oscillator 100 and to an integrator circuit 86. During the gap between successive data blocks the variable oscillator 100 is forced to its lowest frequency of operation, approximately 800 kHz in this illustrative embodiment. The first fixed length pulse generated by the multi-vibrator circuit 82 causes the variable oscillator 100 to increase the frequency of its output signal applied to the counter 84. The counter 84 is responsive to the signal derived from the variable oscillator 100 and is wired to provide an output pulse upon receipt of a given number of input pulses. The counter is, however, still responsive to the oscillator signal and continues to build a cumulative count. The output signal provides by the counter 84 is applied to a decoding circuit 98, which in turn generates at terminal "A" a first aperture or clock signal of defined duration which is applied to the "*b*" input terminals of the AND gates 26 and 28. The decoding circuit 98 may illustratively include a plurality of AND or OR gates selectively connected to the stages of the counter 84 ro remove the aperture signal when the counter 84 reaches a predetermined cumulative count. The first signal derived from the multi-vibrator circuit 82 causes the oscillator 100, the counter 84 and the decoding circuit 98 to generate the first aperture signal for a time interval within a digit period to normally receive the next significant reversal in the middle of the aperture signal. The counter 84 is wired so that at this time it is reset to a "zero" count.

Normally, the application of the aperture signal at this time would permit the signal generated by the threshold detector circuit 24 to pass through the AND gate 28. However, if the next signal derived from the threshold detector circuit 24 does not arrive so as to be sampled at the substantial midpoint of the aperture gate signal derived from the decoding circuit 98, the frequency of the oscillator 100 will be regulated to either increase or decrease thereby bringing the first aperture gate signal generated by the clock circuit 25 into synchronization with the significant signals derived from the medium 10. This regulation is achieved through negative feedback, which is proportional to the lead or lag time displacement and which is applied to the input of the integrator circuit 88.

Figure 2A:
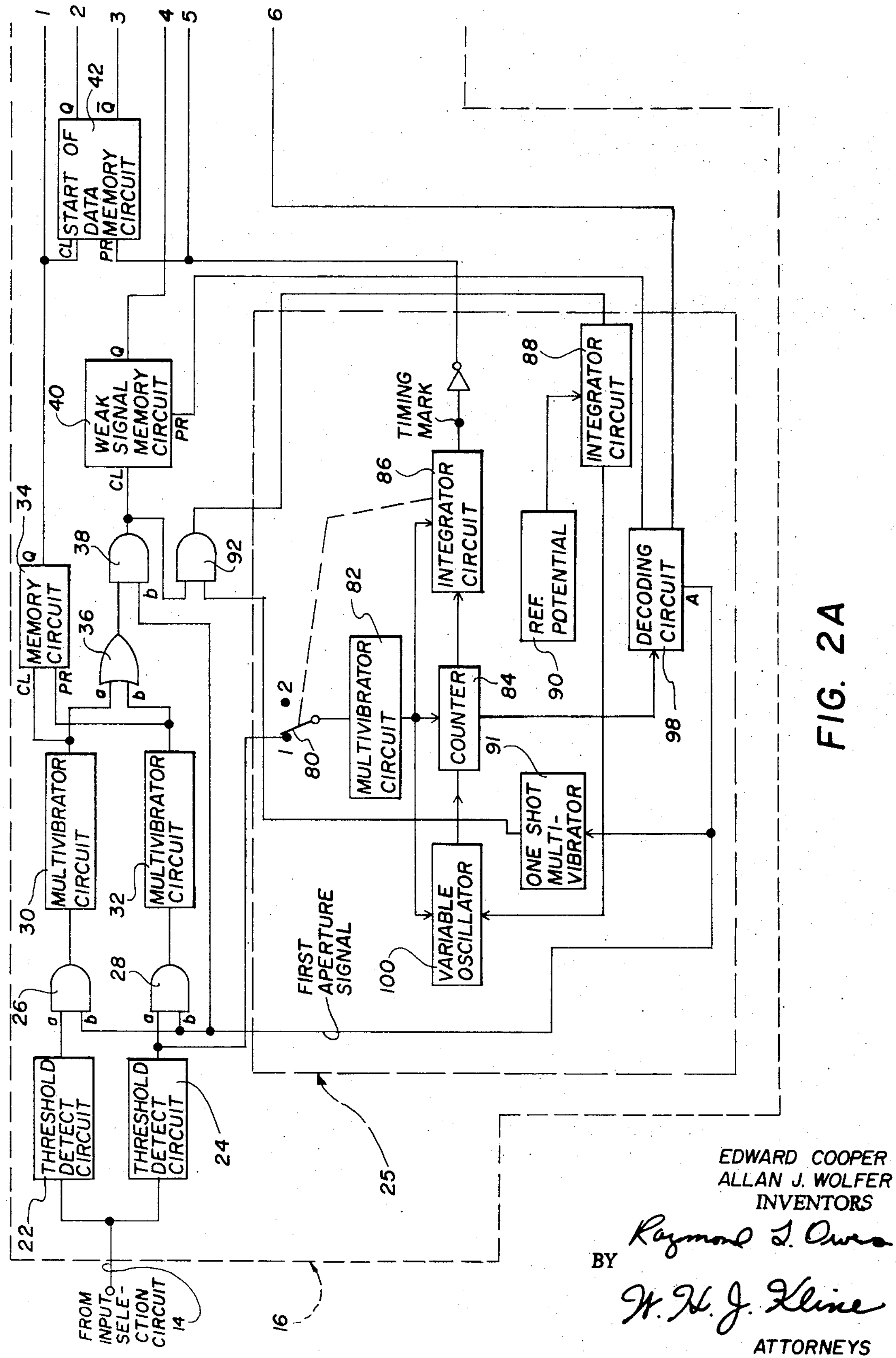
FIGS. 2A and 2B when aligned form FIG. 2 which is a schematic representation of one of the signal conditioning circuits as shown in FIG. 1.
Figure 2B:
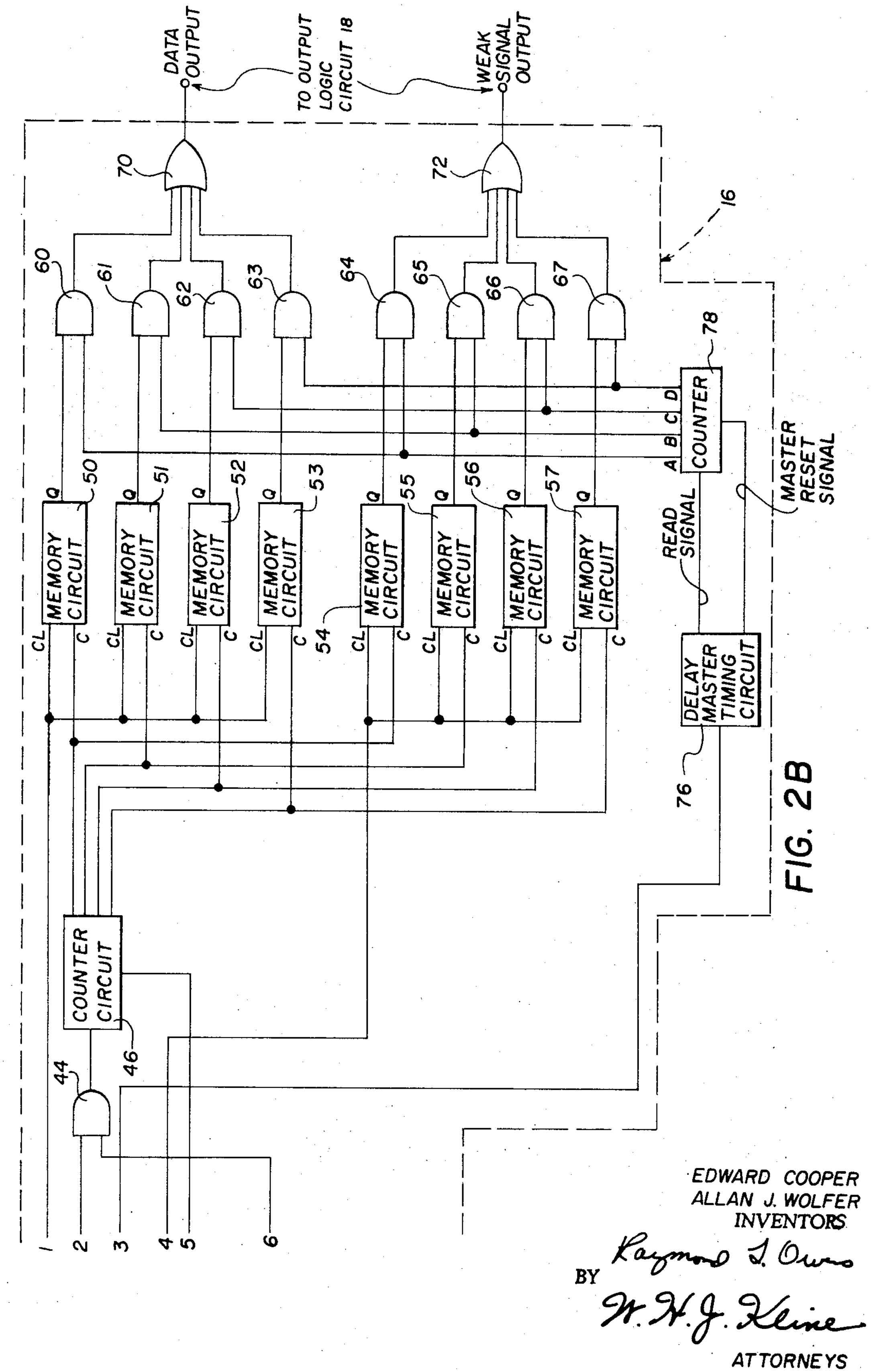

As explained above, the signals derived from the OR gate 36 are indicative of either "1" or "0" signals derived from the corresponding track. During the sensing of the preamble, the signals derived from the threshold detector circuit 24 through the OR gate 36 are indicative of the "0" significant signals and are applied to the AND gate 38. When the first aperture gate signal generated by the decoding circuit 98 is applied, to the AND gate 38, the AND gate 38 provides a signal which is applied to an input of an AND gate 92. As shown in FIG. 2A, the first aperture signal derived from the decoding circuit 98 is also applied to a one-shot multi-vibrator circuit 91, which in response to the first aperture gate signal, generates a second aperture gate signal of fixed pulse width less than that of the first aperture signal. The second aperture gate signal is applied to the other terminal of the AND gate 92 which serves to limit the maximum change in feedback signal. More specifically, the variable oscillator 100 is operating at a normal frequency so that the aperture gate signals are in synchronism with the significant signals derived from the medium 10, and the AND gate 92 generates an error signal of a normal pulse width with an illustrative length of 1 u second. If the frequency of the oscillator 100 is to slow and the first aperture gate signals derived from the circuit 98 are lagging in time with respect to the significant signals derived from the medium 10, the error signal derived from the AND gate 92 will be of a decreased pulse width. If, however, the oscillator 100 is operating at too high a frequency, the generated significant signals will arrive at the AND gate 92 late with respect to the second aperture gate signal; as a result, the error signal generated by the AND gate 92 will be of an increased pulse width.

As shown in FIG. 2A, the error signal generated by the AND gate 92 is applied to the integrator circuit 88 which applies a "bias" signal to the variable oscillator 100 to correct or adjust the frequency of the variable oscillator 100. The integrator circuit 88 integrates the pulse width to provide the bias signal indicative thereof. A reference potential source 90 is provided to permit the bias signal derived from the integrator circuit 88 to be adjusted for the particular variable oscillator 100 incorporated in this circuit. In a manner explained above, the frequency of the variable oscillator 100 is adjusted to place the significant signal at the midpoint of the first aperture signals. In this manner the variable oscillator 100 is synchronized with the receipt of the significant reversals of the preamble and is now prepared to receive the input signals of the data portion of the phase encoded signal.

As the variable oscillator 100 of the clock circuit 25 is synchronized with the preamble, the multi-vibrator circuit 82 applies constant width pulses in response to the "0" pulses of the preamble to the integrating circuit 86. The integrator circuit 86 includes counting means which in effect count the number of pulses received from the multi-vibrator circuit 82 and upon receipt of a given number, for example 25 pulses, will remove the reset signal from the start of data memory circuit 42 and from the counter circuit 46 to prepare the aforementioned circuits for receiving the data signals. Further, the integrating circuit 86 upon receiving 25 pulses from the multi-vibrator circuit 82, will effect the switching of the switch 80 from the first to the second position and will also generate a timing or tape mark signal to be used as will be explained later. It is noted that though the switch 80 has been shown in terms of a mechanical switch, that in an illustrative embodiment of this invention, the switch 80 could be a solid state device responsive to an electrical signal generated by the integrator circuit 86. As a result, after the receipt of approximately 25 pulses, the integrator circuit 86 responds to dispose the switch 80 from its first and second position so that the signals derived from the threshold detecting circuit 24 are no longer applied to the multi-vibrator circuit 82 and that sync pulses are no longer applied to the variable oscillator 100. It may be understood that the sync pulses derived from the multivibrator circuit 82 serve to reset the variable oscillator 100. Thus, during the continued operation of the signal conditioning circuit 16, the variable oscillator 100 is no longer reset by each of the sync pulses derived from the multivibrator circuit 82 but is permitted to generate sustained oscillations whose frequency is continued to be adjusted by the bias signal provided by the integrator circuit 88. During the continued operation of the signal conditioning circuit 16 to process the information bearing portion of the data block, a feedback signal will be generated by the AND gate 92 and that a biasing signal will be applied to the variable oscillator 100 to continue to maintain the frequency of the variable oscillator 100 is synchronization with the significant signals derived from the medium 10. Thus, the clock 25 will continuously adapt itself to the data rate of the bytes after synchronization has been acquired.

During the first 25 "0" signals of the preamble, the conditioning signal (i.e., absence of reset signal) is applied by the integrating circuit 86 to the reset terminal of a start of data memory circuit 42 and the counter circuit 46. When the integrator circuit 86 has detected the passage of approximately 25 "0" pulses of the preamble, the reset signal is generated to enable the start of data memory circuit 42 and the counter circuit 46 to thereby permit data and weak signals to be respectively stored upon the memory circuits 50 to 53, 54 to 57 as explained above. As mentioned above, the last signal in the preamble is a "1," which is sensed by the threshold detecting circuit 22. The resulting output signal from the threshold detecting circuit 22 is applied through the enabled AND gate 26 and the multi-vibrator circuit 30 to the clear input terminal of the memory circuit 34. As the first 40 "0" signals of the preamble are applied to the present input of the memory circuit 34, the memory circuit 34 provides corresponding "0" output signals which are applied in turn to the clear input terminal of the start of data memory circuit 42. Upon the occurrence of the first "1" signal of the preamble, the memory circuit generates a "1" signal at its Q output terminal to be applied to the clear input terminal of the start of data circuit 42. The start of data memory circuit 42 is responsive to the "1" signal applied to its clear input terminal (CL) to generate at its Q output terminal a "1" start of data signal (SOD) which is applied to an AND gate 44 (see FIG. 2B). In response to the start of data signal (SOD) and a reference gating signal derived from the decoding circuit 98, the AND gate 44 passes the start of data signal to the counter circuit 46 to thereby initiate the counting operation and the application of the data and weak signals to the memory circuits 50 to 53, and 54 to 57, respectively. It is noted that previously a reset signal had been applied by the integrator circuit 86 to the reset terminal of the counter circuit 46. It may be understood that there are eight other start of data memory circuits similar to circuit 42 disposed in each of the eight information tacks and the parity track of the information storage medium 10. As will be explained later, the start of data signal (SOD) derived from the signal conditioning circuits 16 will be used to synchronize a master delay timing circuit 76 which in turn will control the strobing out of information by the counter 78 of each of the signal conditioning circuits 16.

As explained above with respect to FIG. 2, it is necessary to provide a delay between the first start of data signal and the strobing out of either the data information or the weak signals through the OR gates 70 or 72, respectively. As shown in FIG. 2, a start of data signal is derived from the Q output terminal of the start of data memory circuit 42 and is applied to the master delay-timing circuit 76 which in turn supplies a strobing or read signal and a reset signal to a counter 78. In an illustrative embodiment of this invention, the master delay-timing circuit 76 may provide illustratively a sixteen microsecond delay between the detection of the first start of data signal and the strobing out of the first data information signals to permit the storage on the memory circuits of all the bits relating to a single byte before the information bits are strobed out from each of the signal conditioning circuits 16.

Figure 4A:
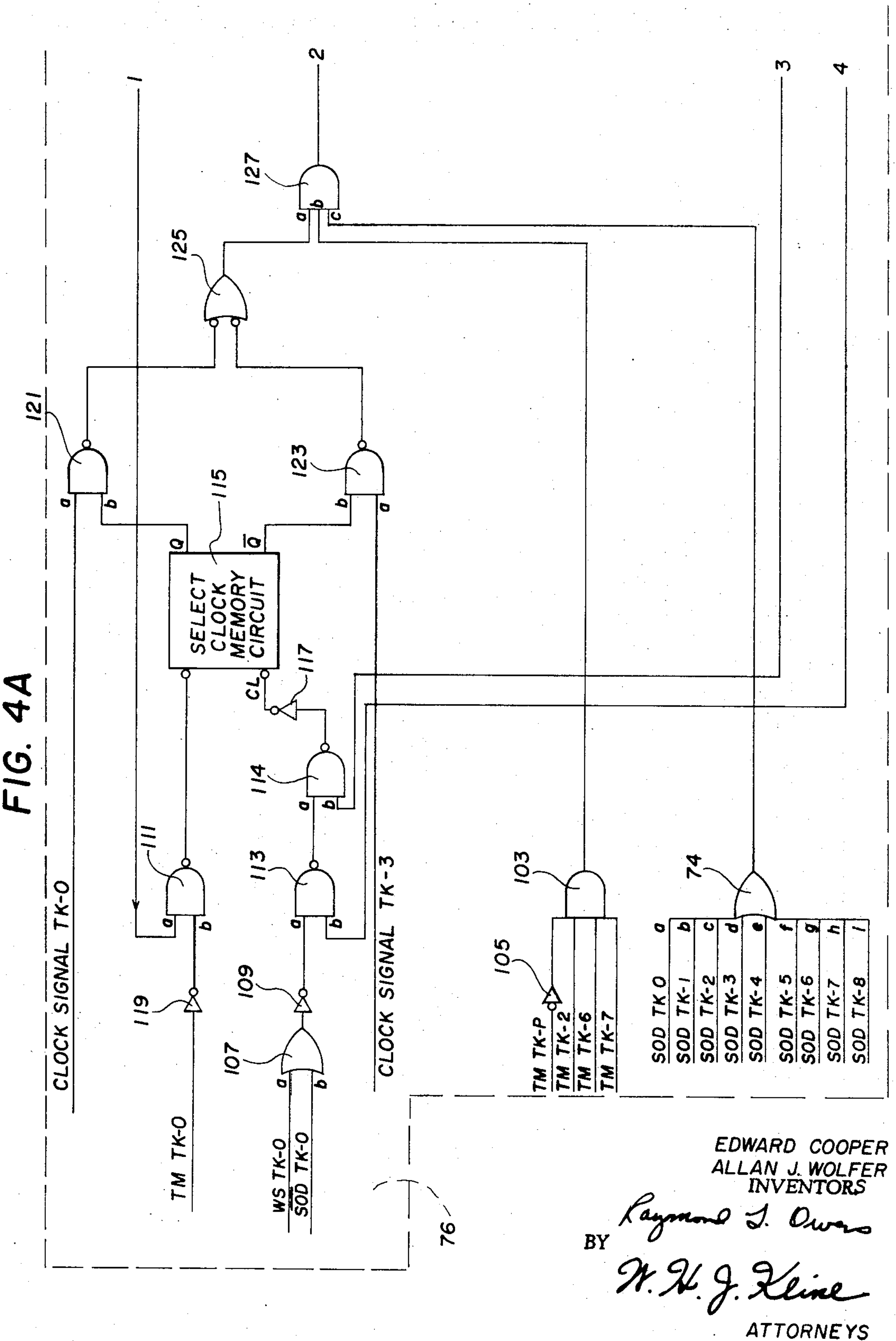
FIGS. 4A and 4B when aligned form FIG. 4 which shows schematically a portion of the output logic circuit shown in FIG. 1 and including a master clock circuit for initiating the timing operation in response to the start of data signals derived from each of the plurality of tracks and for providing read signals for "-strobing out" in synchronism the information bits stored on the memory circuits of each of the signal conditioning circuits associated with each track.
Figure 4B:
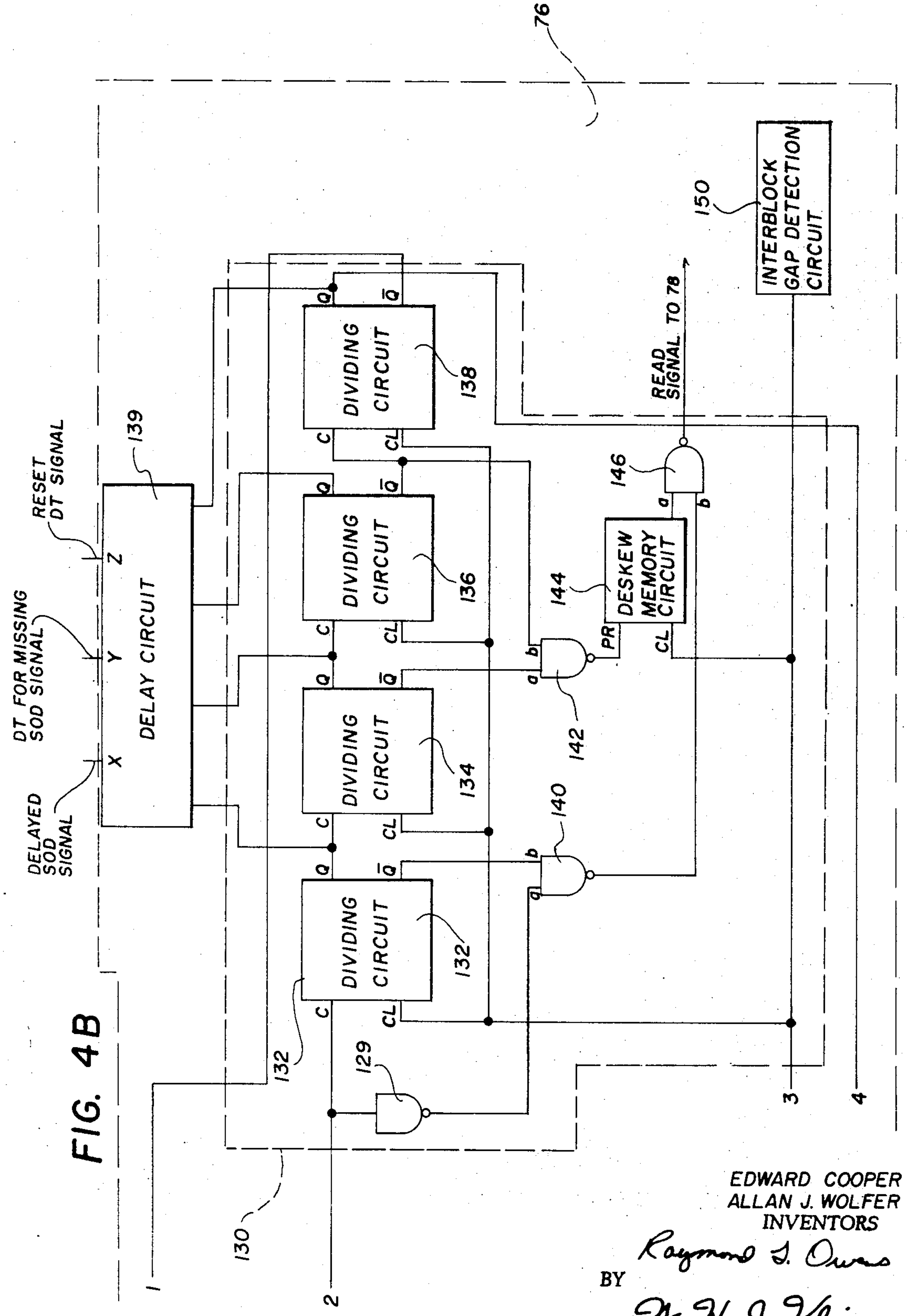

With regard to FIG. 4, there is shown as illustrative embodiment of the delay-master clock circuit 76. As will become evident from the following discussion, the delay-master clock circuit operates 76 to synchronize the various functions of the signal conditioning circuits **16*a* to 16*i* and more specifically to strobe out simultaneously the bits of a single information byte which are stored on a corresponding memory circuit of each of the signal conditioning circuits 16*a* to 16*i*. The master delay-timing circuit 76 includes an OR gate 74** having input terminals *a* to *h*. As indicated on FIG. 4A, the input terminals a to *i* of the OR gate 74 of the storage medium 10 are connected to receive the start of data signals derived from tracks 0 to 8. More specifically, the start of data signal derived from the $\overline{Q}$ output terminal of the start of data memory circuit 42 of each of the signal conditioning circuits 16 is applied respectively to the corresponding input terminal of the OR gate 74. Primarily, the OR gate 74 responds to the first start of data signal derived from any of the information or parity tracks of the information storage medium 10 to apply a first start of data or initiate signal to the *c* input terminal of an AND gate 127. The enabled AND gate 127 generates an output signal which is applied to a master clock circuit 130 (see FIG. 4B), which produces a read signal which is applied in turn to the counter circuit 78 (see FIG. 2B) associated with each of the signal conditioning circuits **16*a* to 16*i*. The AND gate 127** has *a*, *b* and *c* input terminals. The *b* input terminal is connected to an AND gate 103 which has input terminals *a*, *b*, *c* and *d* for receiving the timing or tape mark signals (TM) generated by the signal conditioning circuits 16 associated illustratively with the parity track, the second track, the sixth track and the seventh track of the medium 10. In recording phase encoded signals on a plurality of tracks, it is normal practice to record an identification mark identifying the type of recording as being phase encoded as opposed to other modes or type or recordings. In order to avoid the possibility that the identification mark may be confused with the preamble, the output signal derived from the AND gate 103 is indicative of the absence of the identification mark. More specifically, the particular combination of timing or tape marks derived simultaneously from the parity, second sixth and seventh tracks of the medium 10 indicate the presence of a phase encoded identification burst. More specifically, the timing mark derived from the signal conditioning circuit associated with the parity track is applied through an inverter circuit 105 to the "*a*" input terminal of the AND gate 103.

In order to generate a read signal, a clock signal is derived from a selected signal conditioning circuit 16 and is used to synchronize the operations of the entire information handling apparatus. Further, provision is made for the situation in which the clock signal derived from a signal conditioning circuit associated with one track is defective, by providing a suitable switching circuit for applying the clock signal from a second, backup signal conditioning circuit. In the illustrative embodiment shown in FIG. 4, the primary clock signal is derived from the signal conditioning circuit associated with the zero track, and the backup or secondary clock signal is derived from the signal conditioning circuit associated with the third track. Basically, if a weak signal appears in the preamble of the phase encoded signal recorded upon the zero track, the switching circuitry will sense this weak signal and will automatically apply the clock signals derived from the third track to the master clock circuit 130. Similarly, if a weak signal appears in the zero track while data information is being sensed, the switching circuitry will automatically apply the clock signal derived from the third track to the master clock 130.

In the illustrative embodiment shown in FIG. 4, the clock signal derived from the signal conditioning circuit associated with the zero track is applied to the "*a*" input terminal of NAND gate 121, whereas the clock signal derived from the signal conditioning circuit associated with the third track is applied to the "*a*" input terminal of NAND gate 123. The enabling signals to be applied to the "*b*" terminals of the NAND gates 121 and 123 are respectively derived from the Q and $\overline{Q}$ output terminals of a select clock memory circuit 115. Depending upon the state and the output signal derived from the select clock memory circuit 115 either the NAND gate 121 or 123 will be enabled to permit the selected clock signal to be applied to the master clock circuit 130. Further, the output signals derived from the NAND gate 121 and 123 are applied to the inputs of a NOR gate 125, whose output terminal is applied in turn to the "*a*" input terminal of AND gate 127. Assuming that the absence of an identification burst manifestation is applied to the AND gate 127, the selected clock circuit signal will be applied to the master clock circuit 130.

The state of the clock circuit 115 is determined in the following manner: a timing mark is derived from the integrator circuit 86 of the signal conditioning circuit associated with the zero track and is applied through an inverter circuit 119 to the "*b*" input terminal of a NAND gate 111 whose output terminal is connected to the preset terminal of the select clock memory circuit 115. The weak signal generated by the weak signal memory circuit 40 of the signal conditioning circuit associated with the zero track is applied to the "*a*" input terminal of a NOR gate 107, whereas the reciprocal start of date signal ($\overline{SOD}$) derived from the $\overline{Q}$ terminal of the start of data memory circuit 42 is applied to the "*b*" input terminal of the NOR gate 107. In turn, the output signal derived from the NOR gate 107 is applied through an inverter circuit 109 to the "*a*" input terminal of a NAND gate 113. An enabling signal is derived from the Q output terminal of a dividing circuit 138 (of the master clock circuit 130, see FIG. 4B) and is applied to the "*b*" input terminal of the NAND gate 113. The output signal generated by the NAND gate 113 is applied the "*a*" input terminal of a NAND gate 14. A detector circuit 150 is responsive to the passage of a block between information blocks to generate and apply a master reset signal to the "*b*" input terminal of the NAND gate 114. The output signal derived from the NAND gate 114 is applied through an inverter circuit 117 to the clear input terminal (CL) of the select clock memory circuit 115.

The selected clock signal is applied through the AND gate 127 to the master clock circuit 130 which includes as shown in FIG. 4B a plurality of dividing circuits 132, 134, 136 and 138 which may take illustratively the form of flip-flop circuits. In an illustrative embodiment of this invention, the selected clock signal has a frequency of approximately 240 kHz and is applied through the AND gate 127 to the clock input terminal (C) of the dividing circuit 132, which operates to divide the frequency of the selected clock signal by half and to apply a 120 kHz signal from its Q output terminal to the clock input terminal (C) of the dividing circuit 134. Similarly, the dividing circuit 134 provides a 60 kHz signal to the clock input terminal (C) of the dividing circuit 136. The $\overline{Q}$ output terminal of the dividing circuit 136 is connected to the preset terminal (PR) of the dividing circuit 138 to provide a 15 kHz signal. In turn, the Q output terminal of the dividing circuit 138 is connected to the "*b*" input terminal of the NAND gate 113 (see FIG. 4A). The master reset signal provided by circuit 150 is applied to the clear input terminals (CL) of each of the dividing circuits 132, 134, 136 and 138. As mentioned above, the read signal is delayed until all of the input data signals are stored upon their respective memory circuits; this delay is achieved by a deskew memory circuit 144 whose output terminal $\overline{Q}$ is coupled to the "*a*" input terminal of AND gate 146. The other input terminal of the AND gate 146 is connected to an AND gate 140 whose input terminals "*b*" and "*a*" are respectively connected to the $\overline{Q}$ output terminal of the dividing circuit 132, and through an inverting circuit 129 to the output terminal of the AND gate 127. The preset input terminal (PR) of the deskewing circuit 144 is connected to the output terminal of NAND gate 142 whose input terminals "*a*" and "*b*" are respectively connected to the $\overline{Q}$ output terminals of dividing circuits 134 and 136.

Initially during the sensing of the preamble and before the first start of data signal, the weak signal derived from the weak signal memory circuit 40 of the signal conditioning circuit associated with the zero track is a "0" signal. In response thereto, the NOR gate 107 will produce a "0" output signal which will be inverted by the circuit 109 so that a "1" signal is applied to the "*a*" input terminal of the NAND gate 113. However, the NAND gate 113 is inhibited by a "0" signal derived from the Q output terminal of the dividing circuit 138 and applied to the "*b*" input terminal of the NAND gate 113. As will become evident later, the signal derived from the Q output terminal dividing circuit 138 remains a "0" until two pulse bit periods have passed after the first start of data signal. During the interblock gap, a master reset signal is generated and is applied to enable the NAND gate 114, which in turn applies a "1" signal to the inverter circuit 117. As a result, the inverter circuit 117 applies a "0" to signal to the clear input terminal (CL) of the select clock memory circuit 115 to clear the circuit 115, i.e., "1" and "0" signals are generated respectively at the Q and $\overline{Q}$ output terminals of the select clock memory circuit 115 to thereby enable the NAND gate 123 and inhibit NAND gate 121. As a result, the clock signal derived from the signal conditioning circuit associated with the third track is applied to the master clock circuit 130 if the other conditioning signals are applied to enable the NAND gate 127.

At this point in time, the signal conditioning circuits are sensing the preamble of their respective tracks. As explained above, when the integrating circuit 86 of the signal conditioning circuit associated with the zero track, has sensed a predetermined number of pulses in the preamble, a "0" signal (i.e., the timing mark signal TM) is generated by the corresponding circuit 86 and is applied to the inverter circuit 119. In response thereto, the inverter circuit 119 applies a "1" signal to the "*b*" input terminal of the NAND gate 11. The $\overline{Q}$ output terminal of the dividing circuit 138 applies a "1" signal to the "*a*" input terminal of the NAND gate 111, and the NAND gate 111 is enabled to apply a "0" signal to the preset input terminal PR of the select clock memory circuit 115. In response to the "0" signal, the select clock memory circuit 115 changes its state so that a "1" signal is derived from the Q output terminal to hereby enable the NAND gate 121 and a "0" signal is derived from the $\overline{Q}$ terminal to thereby inhibit NAND gate 123. Thus, the clock signal derived from the signal conditioning circuit associated with the zero track is allowed to pass through the NAND gate 121, the NOR gate 125 and the AND gate 127 (if the other input conditions of the AND gate 127 have been met) to be applied to the master clock 130. In this manner, the delay-master timing circuit 76 will operate to normally select the clock signal derived from the signal conditioning circuit associated with the O track and to apply it to the master clock circuit 130.

However, if a weak signal (i.e., the absence of a significant reversal) appears on the zero track, a "1" signal derived from the $\overline{Q}$ output terminal of the weak signal memory circuit 40 of the signal conditioning circuit associated with the zero track will be applied to the "*a*" input terminal of the NOR gate 107. In response, NOR gate 107 generates a "0" signal which is inverted by the inverter circuit 109 so that a "1" signal is applied to the "*a*" input terminal of NAND gate 113. As indicated above, the input signal applied to the "*b*" input terminal of the NAND gate 113 is derived from the Q output terminal of the dividing circuit 138 which remains a "0" signal throughout the remainder of the processing of information of the information block. In turn, a "1" signal is derived from the NAND gate 113 and applied to the "*a*" input terminal of the NAND gate 114; the NAND gate 114 applies a "1" signal to the inverter circuit 117 which in turn applies a "0" signal to the clear input terminal of the select clock memory circuit 115. In response to the "0" signal applies to the clear terminal (CL), the select clock memory circuit 115 changes state to provide at its $\overline{Q}$ output terminal a "0" signal to enable NAND gate 123 and to provide at its Q output terminal a "1" signal to inhibit NAND gate 121. As a result, the clock signal derived from the signal conditioning circuit associated with the zero track is no longer applied to the master clock circuit 130 and now as a result of the sensing of the weak signal, the clock signal derived from the signal conditioning circuit associated with the third track is appropriately gated and applied to the master clock circuit 130.

Figure 3A:
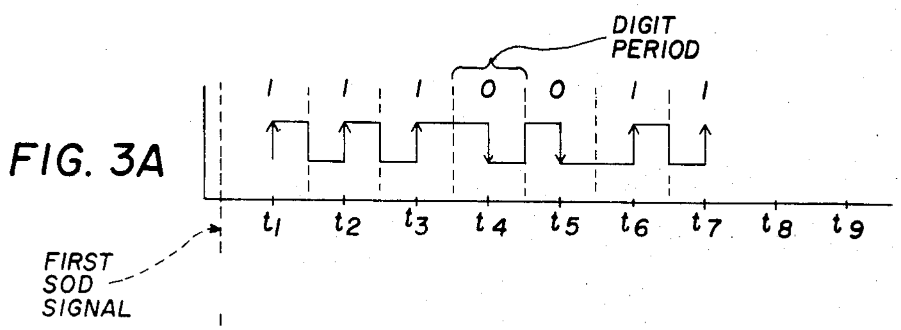
FIGS. 3A thru 3G when aligned form FIG. 3 which is a diagram showing the characteristics of a phase encoded signal which is processed in accordance with the teachings of this invention.
Figure 3B:
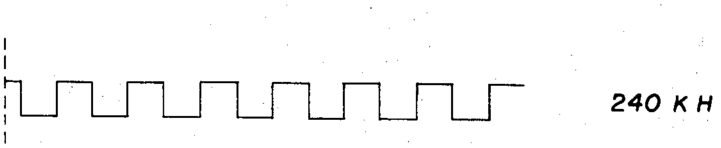
Figure 3C:
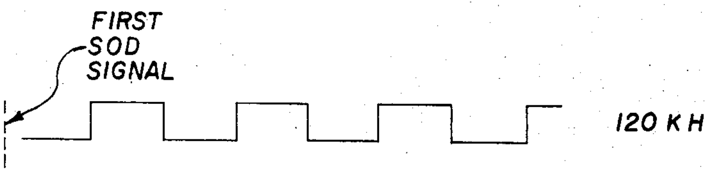
Figure 3D:
Figure 3E:
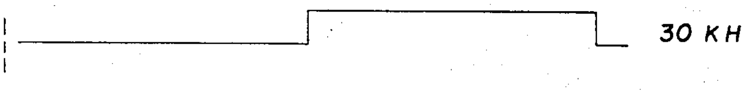
Figure 3F:
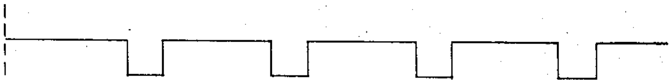
Figure 3G:
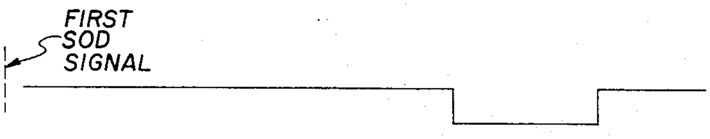

Normally, the AND gate 146 is enabled to permit read pulses generated by the master clock circuit 130 to be applied to each of the counters 78 associated with the signal conditioning circuit **16*a* to 16*i* to thereby simultaneously read out the data information stored upon the memory circuits 50 to 53 (and the memory circuits 54 to 57). As explained above, a master reset signal is generated upon the detection of the interblock gap and is applied to the clear input terminals of each of the dividing circuits 132, 134, 136 and 138, and to the clear input terminal of the deskew circuit 144 to thereby dispose the deskew circuit 144 in a clear state and to provide its Q output terminal a "1" signal which inhibits AND gate 147. As a result, until AND gate 146 is enabled, no read signals may be derived from the master clock circuit 130. In normal operation as explained above, the first start of data signal will be indicated by a signal derived from the nine input OR gate 74, which in turn will enable the passage of a signal derived from the signal conditioning circuit associated with the zero track to be applied to the master clock circuit 130. The selected clock signal is applied to the master clock circuit 130 and more particularly to the inverter circuit 129 whose output signal is shown in FIG. 3*b*. The signal derived from the inverter circuit 129** and applied to the "*a*" input terminal of the NAND gate 140, has a frequency of 240 kHz. The selected clock signal is also applied to the clock input terminal (*c*) of the dividing circuit 132 which provides at its $\overline{Q}$ output terminal a signal as shown in FIG. **3*c* having a frequency (i.e., 120 kHz) half of that of the signal applied to the clock input terminal. As shown in FIG. 4*b*, the signal derived from the $\overline{Q}$ output terminal of the dividing circuit 132** is applied to the "*b*" input terminal of the NAND gate 140 whose output signal is shown in FIG. **3*f*** and is applied to the "*b*" input terminal of the AND gate 146. As explained above, the AND gate 146 is initially inhibited so as to prevent the passing of the signal derived from the NAND gate 140. Further, a signal complementary to that shown in FIG. **3*c* is derived from the Q output terminal of the dividing circuit 132** and is applied to the clock input terminal "*c*" of the dividing circuit 134, which in turn generates at its $\overline{Q}$ output terminal a signal shown in FIG. **3*c* and having a frequency (i.e., 30 kHz) one half of that applied to its clock input terminal. The signals derived from the Q output terminals of the dividing circuits 134 and 136** are applied respectively to the "*a*" and "*b*" input terminals of the NAND gate 142. As is well known in the art, the NAND gate 142 will generate a series of "0"

pulses in response to the periodic signals generated at the $\overline{Q}$ output terminals of the dividing circuits 134 and 136 as shown in FIG. 3*g*. The output of the NAND gate 142 is applied to the preset input terminal (PR) of the deskew circuit 144 to thereby preset the deskew circuit 144 and to provide a "0" signal at its $\overline{Q}$ output terminal thereby enabling the AND circuit 146. As indicated in FIG. 3*g*, the enabling "0" pulse is derived approximately two period bits after the first start of data signal has been received from the nine input OR gate 74. As a result, the AND gate 146 will not be enabled and the read signals will not be applied to the counter circuits 78 until the information bits and parity bit associated with the nine tracks of the medium 10 are stored in their corresponding memory circuits. At this time, the AND gate 146 will be enabled as explained above and read signals derived through the NAND gate 140 will simultaneously read or strobe out the information stored upon the corresponding memory circuit of each of the signal conditioning circuits 16*a* to 16. As explained above, the information bits derived from a single track are sequentially applied in the order received first to the memory circuit 50 and then in sequence to the memory circuits 51 , 52 and 53 and are read out when the AND gates 60, 61, 62 and 63 are enabled to thereby derive the information output signals. The counter 78 responds to the first input read signal to apply a "1" signal to enable the AND gate 60 thereby permitting the signal stored upon the memory circuit 50 to be applied through the AND gate 50 and the OR gate 70 to the data output terminal. In a similar manner, the counter 78 responds to successive read signals to generate at spaced intervals "1" signals at its output terminals B, C and D to thereby successively enable AND gates 61, 62 and 63. It is understood that each AND gate 60 of the conditioning circuits 16*a* to 16*i* is being simultaneously enabled to thereby read out in parallel the information stored upon the memory circuits 50 of each of the signal conditioning circuits 16*a* to 16*i*. In a similar manner, the information stored upon the memory circuits 51, 52 and 53 of each of the signal conditioning circuits 16*a* to 16*i* will be successively read out.

Figure 5:
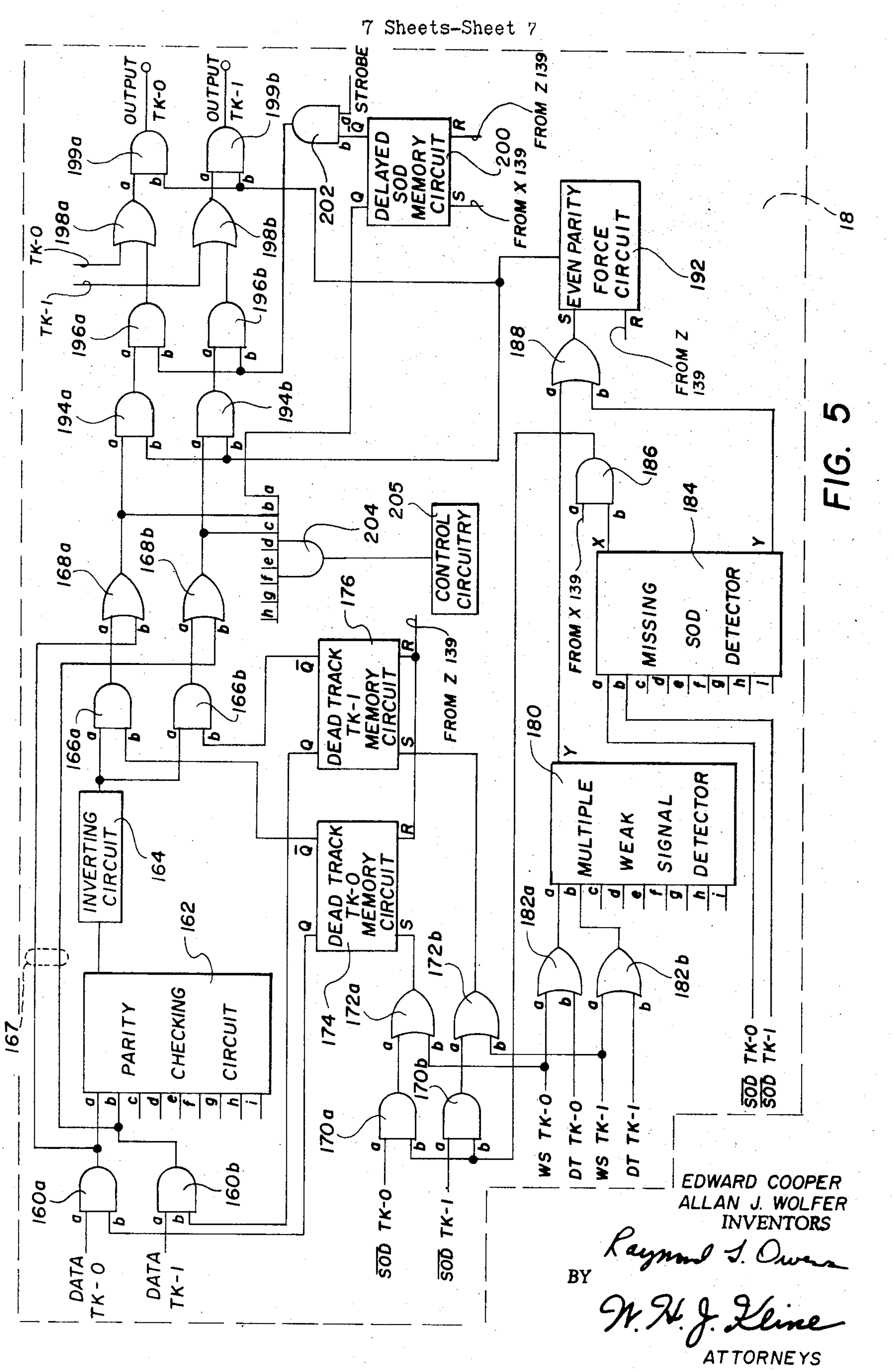
FIG. 5 shows schematically a portion of the output logic circuit shown in FIG. 1 and in particular shows a portion of the parity logic circuit for detecting and correcting for errors in the data derived from the storage medium.

As shown in FIG. 1, the output signals derived from each of the signal conditioning circuits 16*a* to 16*i* are applied to the output logic circuit 18 and in particular to that position of the logic circuit shown partially in FIG. 5. The logic circuit of FIG. 5 serves not only for checking the parity of the signals derived from the medium 10 but also for correcting the missing or erroneous signals derived therefrom. As shown in FIG. 1, a single byte of information typically representing an alfanumeric character is recorded substantially simultaneously as a plurality of bits on tracks 10*a* to 10*i*. More specifically, the information is recorded in binary form on tracks 10*a* to 10*h* and the last track 10*i* is used for providing a parity check of the other bits of the byte. A parity check is provided by predetermining whether the number of "1" bits, an additional "1" bit would be recorded upon parity track 10*i* to provide a total number of "1's" which illustratively is odd. Conversely, if the number of bits in a single character had three "1" bits therein, the bit recorded in the parity track 10*i* would be a "0." Thus, in each case, the number of one bits recorded in a single byte on the tracks 10*a* to 10*i* would be odd regardless of the character of information represented by the byte. In accordance with one aspect of this invention, the information recorded upon the parity track 10*i* may be used to detect a missing or erroneous signal and also to correct or replace the missing signal in its correct track.

With reference to FIG. 5, the data information derived from each of the signal conditioning circuits 16*a* to 16*i* is applied to a plurality of AND gates 160. Though only AND gates 160*a* and 160*b* are shown in FIG. 5 to receive the data information derived from tracks 0 and 1, it may be understood that seven other AND gates are provided to receive and selectively gate the data derived from each of the other tracks of the storage medium 10. An output signal is derived from the AND gate 160, if enabled, and applied to a parity checking circuit 162 which operates to determine whether the number of "1" signals derived from the tracks 10*a* to 10*i* of the medium is an odd number and to provide a signal indicative of whether parity has been satisfied. In an illustrative embodiment of this invention, an odd parity checker made by National Semiconductor under the identifying NO. DM822ON may be incorporated into the circuit. Thus, if only an even number of "1's" are detected by the parity checking circuit 162, a parity error signal will be generated which is applied through an inverting circuit 164 to each of the "*a*" input terminals of a plurality of AND gates 166. Though only two AND gates 160*a* and 160*b* are shown in FIG. 5, it may be understood that there are provided AND gates 160 to receive the decoded signals from each of the signal conditioning circuits 16*a* to 16*i*. Similarly, the parity checking circuit 162 has input terminals "*a*" to "*i*" to determine parity for all of the information and parity signals.

As explained above, the parity checking circuit 162 determines if one of the nine tracks has an erroneous signal. The determination of which tracks has the erroneous signal is made in the following manner. Start of data signals (SOD) indicative of the beginning of the information portion of each information block are derived from each of the signal conditioning circuits 16*a* to 16*i* and are applied to the corresponding AND gates 170. For example, a start of data signal (SOD) derived from the start of data memory circuit 42 of the signal conditioning circuit 16*a*, is applied to the "*a*" input terminal of the AND gate 170*a*. It may be understood that the other start of data signals are similarly derived and applied to their corresponding AND gate 170. Further, there are provided a plurality of OR gates 182 having input terminals to which are applied respectively a weak signal (WS) and a dead track signal (DT). In particular, a weak signal (WS) for track 0 would be developed at the OR gate 72 of the corresponding signal conditioning circuit 16*a* and applied to the "*a*" input terminal of the OR gate 182*a*. The dead track signal is indicative of a track whose information is no longer reliable, i.e., a weak or erroneous signal has been detected or no start of data signal has been detected from that particular track. In an illustrative embodiment of this invention, the dead track signal could be derived from an OR gate (not shown) whose input signals are derived respectively from the OR gate 72 and the $\overline{Q}$ output terminal of the corresponding start of data memory circuit 42. If either a weak signal (WS) or a dead track signal (DT) is received by an OR gate 182, an output signal will be generated and applied to an input terminal of a multiple weak signal detector 180. As shown in FIG. 5, the multiple weak signal detector 180 has input terminals "*a*" to "*i*" for receiving error signals (indicative of a weak signal or a dead track signal) from each of the signal conditioning circuits 16*a* to 16*i*. If more than one such error signal is received from the signal conditioning circuits, the multiple weak signal 180 will generate a signal indicative thereof which is applied to the "*a*" input terminal of OR gate 188. Further, the reciprocal start of data signal $\overline{SOD}$ is derived from each of the signal conditioning circuits 16 (e.g., from the $\overline{Q}$ output terminal of the start of data memory circuits 42), and is applied respectively to the input terminals "*a*" to "*i*" of a missing start of data detector circuit 184. The missing start of data detector circuit 184 has X and Y output terminals upon which are respectively developed signals indicative of one missing SOD signal, and of two or more missing SOD signals.

With reference to FIG. 4, there is shown a delay or decoding circuit 139 having input signals derived from the Q output terminals of dividing circuits 132, 134, 136 and 138. Though not shown, the delay circuit 139 may comprise a series of AND and OR gates for developing a plurality of timing (or enabling) signals at its X, Y and Z output terminals. In particular, a delayed SOD signal is developed at its X output terminal; a dead track for missing start of data signals is developed at its Y output terminal; and a reset dead track signal is developed at its Z output terminal. With reference to FIG. 5, the output signal developed at the X output terminal of the missing start of data detector 184 and indicative of one missing SOD signal, is applied to the "*b*" input terminal of AND gate 186. The dead track for missing start of data signals developed at the Y output terminal of the delay circuit 139 is applied to the "*a*" input terminal of the AND gate 186 and serves to disable AND gate 186 after a fixed delay (as determined by the circuit 139) of sufficient length to permit the start of data signal from each of the tracks to be received and detected. If a missing start of data signal SOD is detected before the expiration of this fixed time period, AND gate 186 will generate a signal which is applied to the "*b*" input terminals of each of the AND gates 170 to thereby enable the AND gates 170. Further, the output signal derived from the Y output terminal of missing SOD detector 184 is applied to the "*b*" input terminal of the OR gate 188, whose output signal is in turn applied to the set input terminal(s) of a source even parity circuit 192. The reset signal applied to the force even parity circuit 192 is derived from the Z output terminal of the delay circuit 139. Thus, the force even parity circuit 192 will be reset or cleared after a fixed delay as determined by the circuit 139 to permit any dead tracks occurring during the previous block of information to be cleared before processing information from the present block of information. The output signal derived from the force even parity circuit 192 is applied to the "*b*" input terminals of AND gates 194. Further, another set of AND 199 gates are disposed between the plurality of OR gates 198 and the output terminals of the circuits shown in FIG. 5. The "b" input terminals of each of the AND gates 199 is connected to the force even parity circuit 192.

Although only a signal AND gate 194 is shown in FIG. 5, it will be understood that an AND gate 194 is provided for each of the information and parity tracks. The output signals derived from each of the AND gates 194 is applied to a set of AND gates 196 which are enabled by a signal developed by AND gate 202. In turn, an input signal is applied to the "*a*" input terminal of AND gate 202 from the $\overline{Q}$ output terminal of a delayed start of data memory circuit 200. The delayed start of memory circuit 200 is set by a signal X derived from delay circuit 139 after a delay period sufficient to permit the receipt of the start of data signals from each of the signal conditioning circuits 16*a* to 16*i*. Upon being set, the delayed start of data memory circuit 200 applies a true signal to the "*a*" input terminal of AND gate 202; a strobe signal of 120 kHz is developed at the $\overline{Q}$ output terminal of dividing circuit 132 and is applied to the "*b*" input terminal of AND gate 202 to thereby enable in synchronization with the read signal the AND gate 202 and the AND gate 196 to permit the transmission of the data to their respective output terminals. Further, the Q output terminal of the delayed start of data memory circuit 200 is connected to the "*a*" input terminal of an AND gate 204; the other inputs to the AND gate 204 are derived from the corresponding OR gates 168. The AND gate 204 serves to detect and to provide a signal indicative of the receipt of all one signals from each of the tracks, which condition is indicative of the first "1" signals of the postamble and constitutes an end of data signal. When such a signal is derived from the AND gate 204, there is indicated that the information portion of the data track has been received. More specifically, the signal derived from AND gate 204 is used to stop the further transmission of postamble data to the computer output microfilmer 20.

As shown in FIG. 5, the information derived from the enabled AND gates 196 is applied to corresponding OR gates 198. In the event that the medium 10 is directed in a backward or opposite direction, signals are derived from the threshold detectors 22 and 24 of the signal condition circuits 16 and are applied through the OR gates 198 to the computer output microfilmer 20 to provide an indication of data.

Briefly, the circuit shown in FIG. 5 operates to sense the number of weak signals (WS) or missing start of data signals (SOD) to correct the signal if only one track is effected, and if more than one track is effected, to disregard that particular block of information. More particularly, the binary information is derived from the signal conditioning circuits associated with each of the tracks 10*a* to 10*i* and are applied to corresponding tracks (all of which are not shown) to provide output signals indicative of the recorded information. Initially, a dead track reset signal is applied to the reset terminal of the dead track memory circuits 174, 176, etc. to remove the dead track manifestation that might have resulted from the previous block of information. As a result, the signals derived from the Q output terminals of the memory circuit 174 and 176 serve respectfully to enable and disable the AND gates 160 and 166. Thus, the information derived from the various signal conditioning circuits 16 is transmitted through the enabled AND gates 160 to terminals "*a*" through "*i*" of the parity checking circuit 162 and to the corresponding set of OR gates 168. In the situation where no error signals or missing start of data signals are detected, the binary information will be directed along a set of "correct signal" conduits 167, through the set of OR gates 168, the enabled NAND gates 194, the enabled AND gates 196, the OR gates 198 and the enabled AND gates 199*a*, to provide at the corresponding outputs, signals indicative of the recorded binary information.

In the situation where an erroneous signal is detected by one of the corresponding signal conditioning circuit 16 to one of the OR gates 182 and also to one of the OR gates 172 corresponding to the particular signal conditioning circuit and track upon which the weak or running signal occurred; thus the particular deficient track is identified. For example, if the erroneous signal appeared in track O, a weak signal would be developed and applied to the "*a*" input terminals of OR gates 172*a* and 182*a*. As a result, a signal derived from the OR gate 172*a* would be applied to reset the dead track memory circuit 174 and a false signal would be generated at the Q output terminal thereof to thereby disable AND gate 160*a*. In addition, a true signal would be generated at the $\overline{Q}$ output terminal of memory circuit 174 to thereby enable AND gate 166*a* (associated with track 0). With only one weak signal detected, the remaining AND gates 160*b* to 160*i* will remain enabled and the decoded binary signals reapplied to the "*b*" to "*i*" input terminals of the parity checking circuit 162, which continues to determine whether parity has been met, i.e., whether the number of one signals within a single byte of information is odd. If parity condition is not met, the circuit 162 will generate through the inverting circuit 164 a true signal to the "*a*" input terminal of the AND gates 166 indicative that a parity condition has not been met. Where just one missing or weak signal is detected, only one AND gate 166 (in the above-described example, AND gate 166*a*) will be enabled whereas the remaining AND gates 166 will be disabled. If the missing bit on track O was a "0" signal, the parity checking circuit 162 will detect that the parity condition of the tracks 0 to 8 has been met and as a result will not generate an error indicating signal, and AND gate 166 will not be enabled. Thus, the signal appearing at the output of OR gate 168*a* will be a "0" or the correct signal. However, if the signal missing on track O is a "1" bit, the parity checking circuit 162 will sense that the parity condition has not been met, i.e., a "1" signal is missing, and will generate through the inverting circuit 164 an enabling signal to AND gate 166*a* which will in turn generate a "1" or correct signal through the OR gate 168*a*. Thus, whether the missing bit is a "0" or a "1," the correct signal will be derived at the OR gate 168.

If more than one weak signal (WS) and/or dead track signal (DT) is applied to the OR gate 182, the multiple weak signal detector 180 will apply a signal indicative thereof from its Y output terminal through the OR gate 188 to the even parity memory circuit 192. The force even parity circuit 192 will respond to such an input signal to generate a false signal which is applied to the "*b*" input terminals of not only the AND gates 194 but also of the AND gates 199. As a result, when more than one erroneous or missing signal is detected within a single byte of information, the information data is no longer transmitted to the output terminals of the circuit shown in FIG. 5. More specifically, a false signal is applied to the "*b*" terminals of selected AND gates 194 to thereby place an odd number of "0" signals from the AND gates 194. In a similar fashion, the false signal is applied to the "*b*" input terminals of selected AND gates 199 with the result that there will appear on the output terminals of the AND gates an even number of "1" signals, which will indicate to the computer output microfilmer 20 (see FIG. 1) that more than one erroneous or missing signal has occurred within a single byte of information and that further signals from the output logic circuit 18 should be disregarded.

If a start of data signal is not generated by a particular signal conditioning circuit 16, this is an indication that the information block recorded on the particular track is either missing or is recorded in a non-readable form, and/or that the particular signal conditioning circuit 16 has not been appropriately conditioned to read out the information track. In the event that one start of data signal is missing, e.g., the start of data signal is missing from track O, a reciprocal start of data signal $\overline{SOD}$ will be applied to the "*a*" input of the missing start of data detector 184 which will generate at its X output terminal a signal to enable AND gate 186. In turn, the AND gate 186 will apply a true signal to the "*b*" input terminals of AND gates 170. In addition, the signal conditioning circuits 6*a* will also apply a reciprocal start of data signal $\overline{SOD}$ to the "*a*" input terminal of the AND gate 170*a* thereby enabling AND gate 170*a* and to apply through OR gate 172*a* a reset signal to the dead track memory circuit 174. In a manner similar to that described above, the memory circuit 174 upon being set, will apply a disabling signal to AND gate 160*a* and an enabling signal to AND gate 166*a*. From this point onward in the procedure, the information derived from track O will be ignored and the correct signal will be generated dependent upon the operation of the parity checking circuit 162. Briefly, the parity checking circuit 162 will indicate in response to the signals from the other data tracks whether parity condition has been met. If the particular binary bit in the track in which the start of data signal was missing is a "1," the missing "1" will be indicated by the parity checking circuit 162 and an enabling signal will be applied to the AND gate 166*a* to thereby generate through the OR gate 168*a* a "1" signal. If the signal in track O is a "0" signal, the parity checking circuit 162 will detect from the other tracks that parity condition has been met and a true signal will be generated so as to apply a disabling signal to the "*a*" input terminal of AND gate 166*a*. As a result, a "0" or correct signal will be provided at the output of OR gate 168*a*. In the condition that start of data signals are missing from more than one track, a corresponding number of reciprocal start of data signals $\overline{SOD}$ will be derived from the corresponding signal conditioning circuits 16 and applied to the input terminals of the missing SOD detector 184, which in response thereto will generate at its X output terminal a signal indicative thereof which is applied through Or gate 188 to set the force even parity circuit 192. In a manner similar to that described above, the memory circuit 192 will apply a false signal to the "*b*" input terminals of the AND gates 194 to thereby prevent the transmission of further data from the output logic circuit 20.

Thus, there has been shown data processing apparatus for detecting a missing or erroneous bit of information within a byte recorded upon a plural track medium and for correcting the missing bit of information. More specifically, a parity track of information is recorded upon the plural track medium and is used to check whether parity has been met by each of the bits of information with its byte. If a single error is detected, the track and also the value of the missing bit may be determined and the correct bit may be supplied. However, if more than on bit within a single byte of information is erroneous or missing, circuit means are provided for preventing the transmission of data to the output and also of providing a suitable signal or manifestation that will indicate to the coupled apparatus (e.g., the computer output microfilmer 20) that a multiple error has occurred and that correction of the information has not taken place.

The invention has been described in detail with particular reference to a preferred embodiment thereof, but it will be understood that variations and modifications can be affected within the spirit and scope of the invention.

I claim:

1. In apparatus for decoding and processing bytes having a plurality of information bits and one parity check bit for the information bits respectively, with the bits of such bytes being recorded in a phase encoded format in selected ones of a plurality of tracks on an information storage medium respectively, the improvement comprising:

a. signal conditioning circuit means adapted to be coupled to the tracks for deriving electrical signals corresponding to the bits of a byte, said signal conditioning circuit means including:
   i. error detection means associated with the tracks and responsive to the failure to decode an information bit for providing an error signal indicative thereof, and
b. output logic means including:
   i. parity check means;
   ii. correction means coupled to said error detection means and said parity check means and responsive to a single error signal for correcting the error condition by inserting a signal bit in the electrical signals associated with such single error signal which satisfies parity check;
   iii. means for applying the corrected electrical signals corresponding to the information bits recorded upon the plurality of tracks to a set of corresponding output terminals; and
   iv. blocking means coupled to said error detection means and responsive to error signals indicative of error conditions in more than one information bit for providing a manifestation that the decoded byte has an error.

2. The invention as set forth in claim 1 wherein there is recorded in the tracks start of data manifestations indicating the beginning of the bytes having information bits, and including second error detection means associated with the tracks and responsive to the failure to decode a start of a data manifestation in a track for producing a second signal; and said blocking means being responsive to two or more first and/or second signals for providing a manifestation that the decoded byte has an error.

* * * * *